United States Patent
Knappe et al.

(10) Patent No.: US 9,774,633 B2
(45) Date of Patent: Sep. 26, 2017

(54) DISTRIBUTED APPLICATION AWARENESS

(71) Applicant: Juniper Networks, Inc., Sunnyvale, CA (US)

(72) Inventors: Michael E. Knappe, Morgan Hill, CA (US); Joe Tomasello, San Jose, CA (US); Krishna Narayanaswamy, Saratoga, CA (US); Alexander S. Waterman, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 15/014,611

(22) Filed: Feb. 3, 2016

(65) Prior Publication Data

US 2016/0156668 A1 Jun. 2, 2016

Related U.S. Application Data

(63) Continuation of application No. 13/631,563, filed on Sep. 28, 2012, now Pat. No. 9,258,313.

(51) Int. Cl.
*G06F 17/00* (2006.01)
*H04L 29/06* (2006.01)

(52) U.S. Cl.
CPC .......... *H04L 63/20* (2013.01); *H04L 63/0236* (2013.01); *H04L 63/0281* (2013.01); *H04L 63/12* (2013.01)

(58) Field of Classification Search
CPC . H04L 63/12; H04L 63/0236; H04L 63/0245; H04L 63/1408; H04L 63/1441; H04L 63/20; G06F 2221/2141; H04W 4/00; H04W 12/06; H04W 4/008

See application file for complete search history.

(56) References Cited

U.S. PATENT DOCUMENTS

| | | | |
|---|---|---|---|
| 6,463,474 B1* | 10/2002 | Fuh | H04L 63/0227 709/225 |
| 7,996,879 B1* | 8/2011 | Fang | G06F 21/35 709/223 |
| 8,326,961 B2 | 12/2012 | Zuk et al. | |
| 9,258,313 B1 | 2/2016 | Knappe et al. | |
| 2010/0192225 A1 | 7/2010 | Ma et al. | |
| 2010/0242093 A1* | 9/2010 | Zuk | H04L 29/06 726/3 |

* cited by examiner

*Primary Examiner* — Mohammed Waliullah
(74) *Attorney, Agent, or Firm* — Harrity & Harrity, LLP

(57) ABSTRACT

A network device is configured to receive network traffic associated with an application executing on a user device; identify, based on the network traffic, an application identifier associated with the application; determine whether the application identifier matches one of a set of application identifiers stored by the network device; identify a policy based on the application identifier when the application identifier matches one of the set of application identifiers; and apply the policy to the network traffic associated with the application. The policy may be obtained from another network device, in communication with the network device, when the application identifier does not match one of the set of application identifiers.

20 Claims, 14 Drawing Sheets

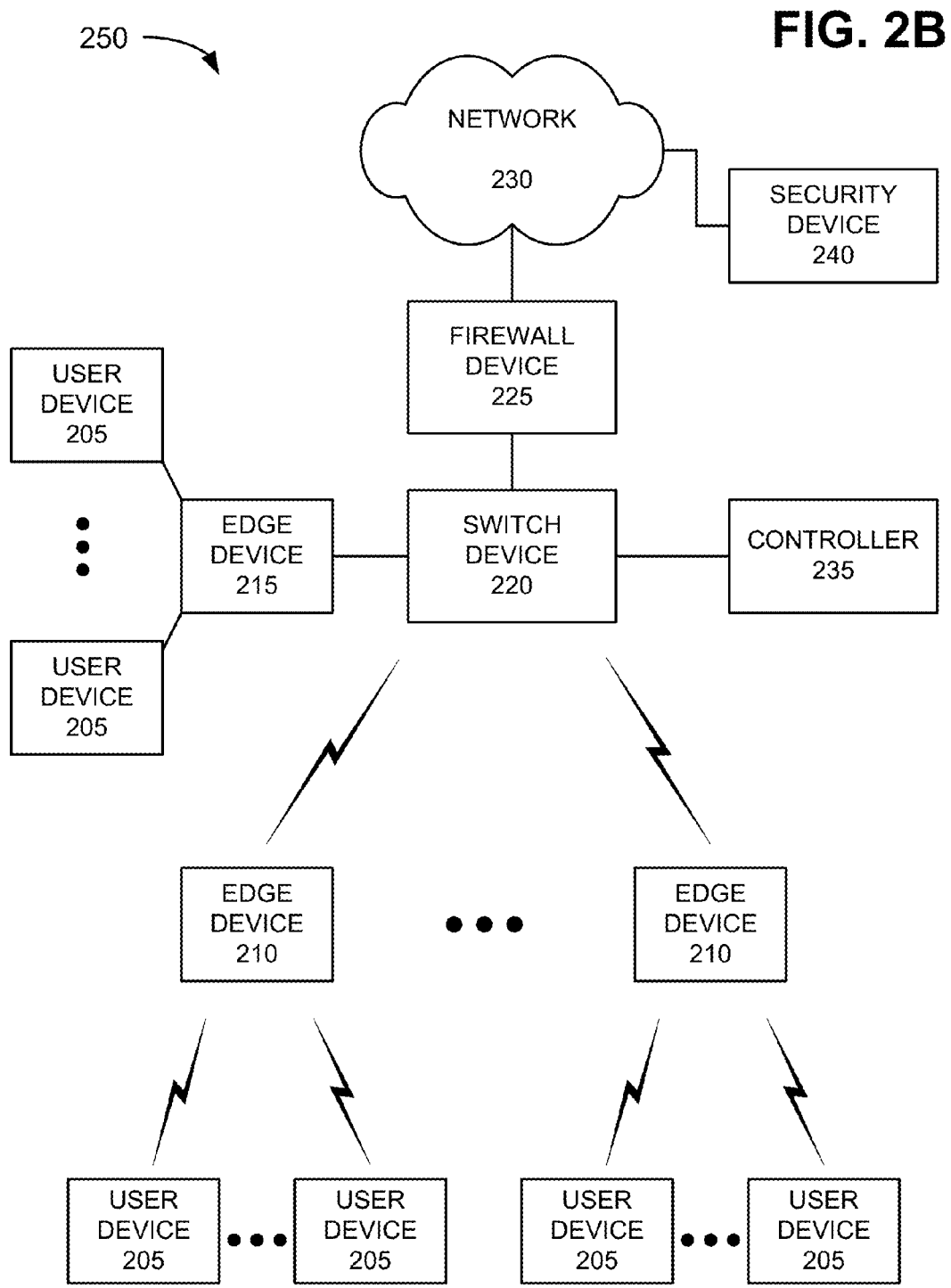

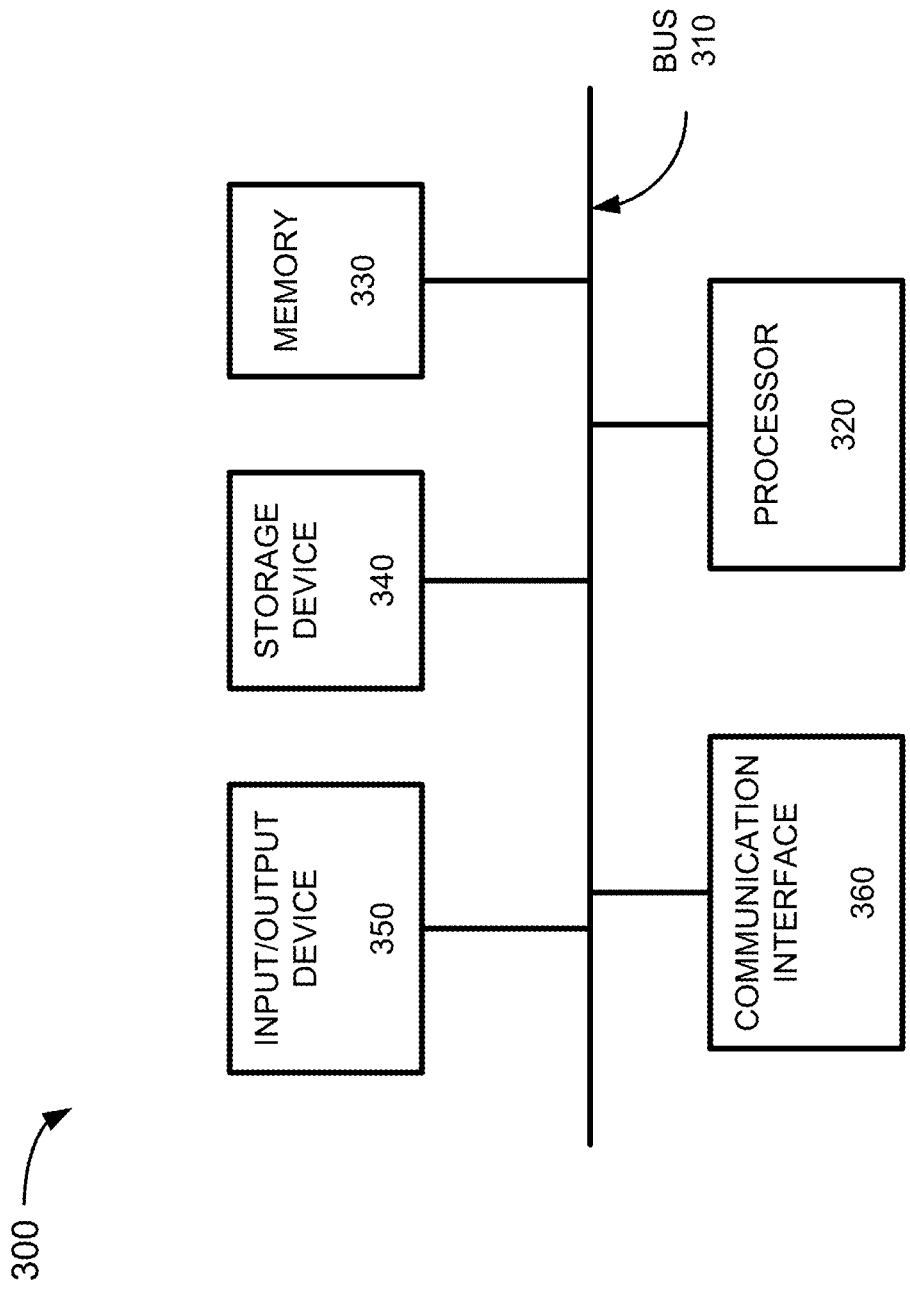

DISTRIBUTED APPLICATION AWARENESS

RELATED APPLICATION

This application is a continuation of U.S. patent application Ser. No. 13/631,563, filed Sep. 28, 2012 (now U.S. Pat. No. 9,258,313), the disclosure of which is incorporated herein by reference.

BACKGROUND

Application awareness services for identification and control of application-specific network traffic have been deployed as a network appliance-based service. The network appliance intercepts network traffic to identify and track end user applications, being run on a customer network, according to customer policy for the customer network. The computational requirements, for identification and control of application traffic, scales with both the growth of the quantity of applications being identified as well as the quantity of network users.

SUMMARY

According to some example implementations, an edge device, of a group of edge devices in communication with a security device, may receive network traffic associated with an application executing on a user device; identify, based on the network traffic, an application identifier associated with the application; and determine whether the application identifier matches one of a set of application identifiers stored by the edge device. When the application identifier matches one of the set of application identifiers, the edge device may identify a policy based on the application identifier, and apply the policy to the network traffic associated with the application. When the application identifier does not match one of the set of application identifiers, the edge device may send information associated with the network traffic to the security device, receive a policy from the security device, and apply the policy, received from the security device, to the network traffic associated with the application.

According to some example implementations, a computer-readable medium may include a group of instructions which, when executed by one or more processors, of an edge device of a group of edge devices in communication with a security device, cause the one or more processors to receive network traffic associated with an application executing on a user device; identify, based on the network traffic, an application identifier associated with the application; determine whether the application identifier matches one of a set of application identifiers stored by the edge device; and when the application identifier matches one of the set of application identifiers, identify a policy based on the application identifier, and apply the policy to the network traffic associated with the application; or when the application identifier does not match one of the set of application identifiers, obtain a policy from the security device, and apply the policy, received from the security device, to the network traffic associated with the application.

According to some example implementations, a method, performed by a network device, may include receiving network traffic associated with an application executing on a user device; identifying, based on the network traffic, an application identifier associated with the application; determining whether the application identifier matches one of a set of application identifiers stored by the network device; identifying a policy based on the application identifier when the application identifier matches one of the set of application identifiers; and applying the policy to the network traffic associated with the application, where the policy may be obtained from another network device, connected to the network device, when the application identifier does not match one of the set of application identifiers.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 2A-2C are diagrams of example environments in which systems and/or methods described herein may be implemented;

FIG. 3 is a diagram illustrating example components of a device in the example environments of FIGS. 2A, 2B, and/or 2C;

DETAILED DESCRIPTION

The following detailed description refers to the accompanying drawings. The same reference numbers in different drawings may identify the same or similar elements.

An implementation, described herein, may provide distributed application awareness. For example, application awareness functions may be performed at edge devices, in a network, and other application awareness functions may be performed at a central security device in the network. The application awareness functions may relate to how an application should be treated in the network, for example, in terms of whether the application should be allowed or denied access to the network, whether the application should be given priority in the network, an amount of bandwidth that should be granted to the application, a quality of service that should be given to the application, whether the application should be permitted to use a resource, or the like.

Figure 1:
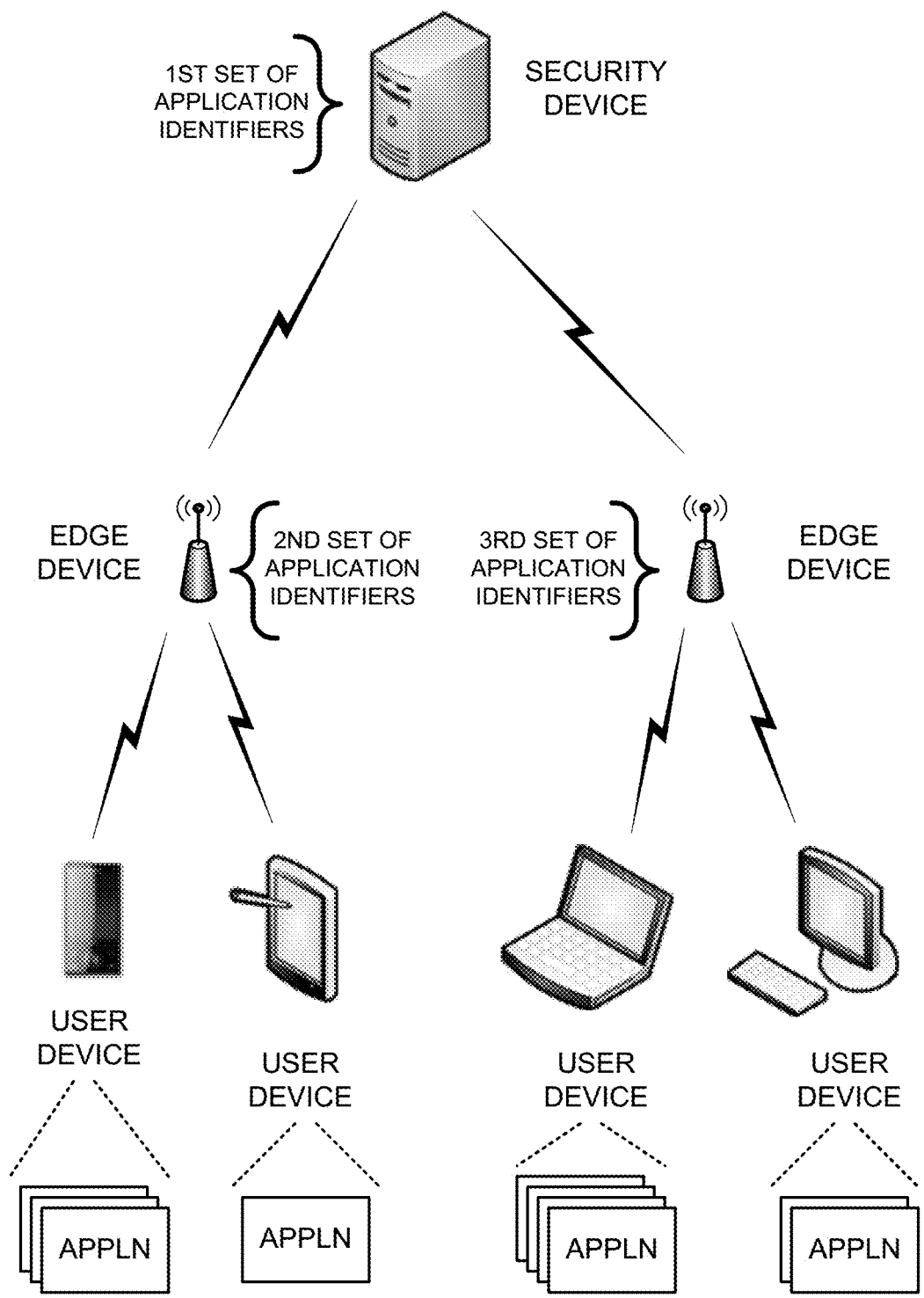
FIG. 1 is a diagram of an overview of an implementation described herein.

FIG. 1 is a diagram of an overview of an implementation described herein. As shown in FIG. 1, user devices may be connected to edge devices, and the edge devices may be connected to a central security device in network. The security device and the edge devices may store sets of application identifiers. An application identifier may correspond to an identifier of an application that may communicate via the network. The application identifiers may be used to identify particular policies to apply to the corresponding applications.

The security device may store a first set of application identifiers, whereas the edge devices may store a second or third set of application identifiers. The edge devices may store the same sets of application identifiers. Alternatively, some edge devices may store different sets of application identifiers. The edge devices may store application identifiers relating to applications that frequently communicate with the network. The security device may store application identifiers relating to applications that infrequently communicate with the network. Performing processing, relating to the frequently occurring application identifiers, at the edge devices may reduce network traffic over performing this processing at the security device.

The user devices may be executing various applications. These applications may attempt to communicate via the network. Before permitting an application to communicate via the network, the edge device, via which the application is attempting to communicate with the network, may determine an application identifier corresponding to the application. If the edge device stores a matching application identifier, then the edge device may determine a policy to apply to the application and may apply the policy to the application. If the edge device does not store a matching application identifier, however, then the edge device may communicate with the security device to determine the policy to apply to the application. In this case, the security device may determine the policy to apply to the application and send that policy to the edge device, and the edge device may apply the policy to the application. Alternatively, the security device may determine the policy to apply to the application and apply the policy to the application (rather than the edge device doing this).

Distributed application awareness, as described herein, may reduce network congestion by performing at least some of the application awareness functions at edge devices. Distributed application awareness, as described herein, may easily scale as the quantity of user devices, using a wireless network, increases.

Figure 2A:
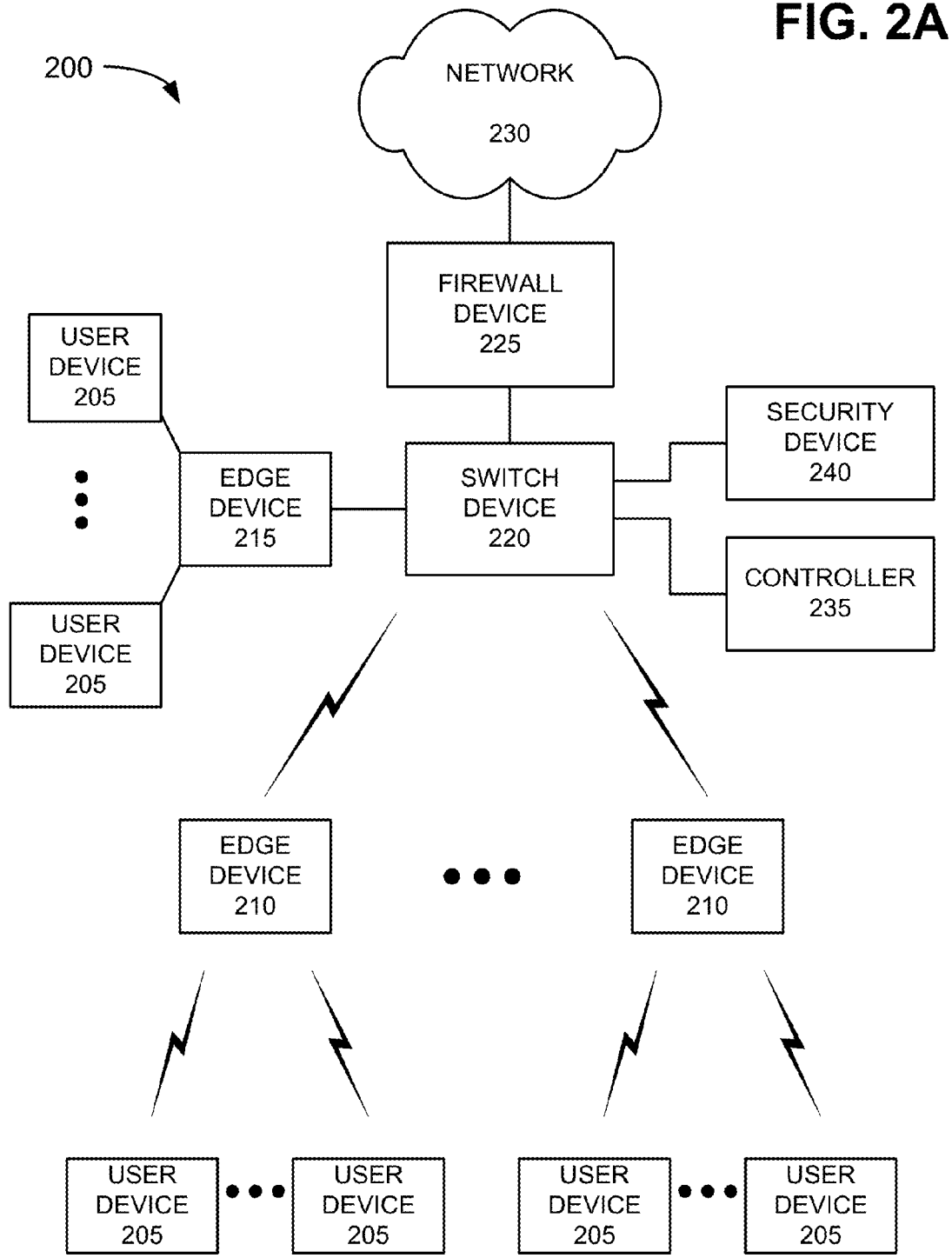
Figure 2C:
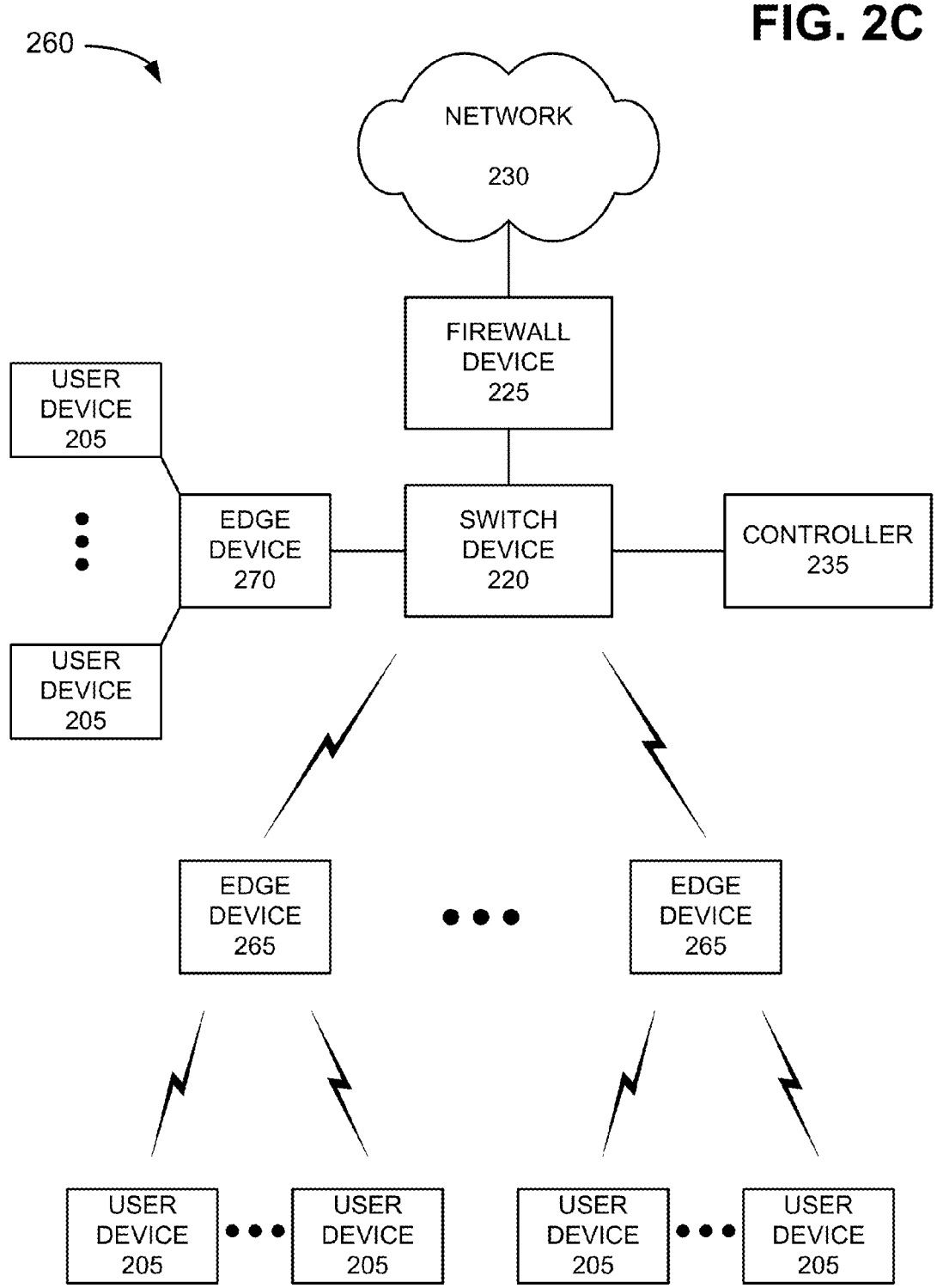

FIGS. 2A-2C are diagrams of example environments 200, 250, and 260, respectively, in which systems and/or methods described herein may be implemented. In some implementations, environments 200, 250, and 260 may include a collection of devices associated with a private network, such as a corporate network, a residential network, or the like.

As shown in FIG. 2A, environment 200 may include user devices 205, edge devices 210 and 215, switch device 220, firewall device 225, network 230, controller 235, and security device 240. In some implementations, edge devices 210 and 215, switch device 220, firewall device 225, controller 235, and security device 240 may be associated with a wireless network, such as a wireless local area network (WLAN), a wireless metropolitan area network (WMAN), a wireless wide area network (WWAN), or the like.

User device 205 may include a client device that is capable of communicating via a network, such as network 230. Examples of user device 205 may include a smart phone, a personal digital assistant, a laptop, a tablet computer, a personal computer, a gaming device, or a combination of these and/or other types of communication devices. User device 205 may store and execute applications that communicate with a network, such as network 230. Examples of these applications might include browser applications, gaming applications, communication applications, or the like.

Edge device 210 may include an access point, such a wireless access point, an edge router, a modem, a base station, or the like. In some implementations, edge device 210 may have an associated connection range and may communicate with user devices 205 in its connection range. Edge device 210 may communicate with user devices 205 using a wireless protocol and a wireless interface. Edge device 210 may connect to switch device 220 using a wired or a wireless interface.

Edge device 215 may include an access point, such as a wired access point, an edge router, a modem, a switch, or the like. Edge device 215 may communicate with user devices 205 using a wired protocol and a wired interface. Edge device 215 may connect to switch device 220 using a wired or a wireless interface.

Switch device 220 may include a network device, such as a switching device, a routing device, a gateway device, a bridging device, or the like. Switch device 220 may connect to edge devices 210 and/or 215, and may connect to firewall device 225 to route traffic between user devices 205 and network 230. Switch device 220 may also connect to controller 235 and security device 240.

Firewall 225 may include a network device, such as a firewall device or a proxy server. Firewall 225 may control access to the wireless network from devices external to the wireless network, such as devices communicating via network 230.

Network 230 may include one or more networks, such as a WAN (e.g., the Internet), a LAN, a MAN, a telephone network (e.g., the Public Switched Telephone Network (PSTN) or a cellular network), a satellite network, or a combination of networks. In some implementations, network 230 may correspond to a public network.

Controller 235 may include a network device, such as a wireless controller. Controller 235 may manage the operation of edge devices 210 and/or 215. Controller 235 may manage load balancing for edge devices 210 and/or 215, manage hand-offs of user devices 205 between edge devices 210 and/or 215, facilitate the sharing of information between edge devices 210 and/or 215, or the like.

Security device 240 may include a network device, such as a security device. Security device 240 may perform functions relating to application awareness. Security device 240 may generate policy data structures and distribute a set of the policy data structures to edge devices 210 and/or 215. In some implementations, security device 240 may store a set of the policy data structures and distribute another set of policy data structures to edge devices 210 and/or 215. In one example implementation, security device 240 may distribute the same set of policy data structures to all of edge devices 210 and/or 215. In another example implementation, security device 240 may distribute different sets of policy data structures to different edge devices 210 and/or 215.

The example quantity and configuration of devices illustrated in FIG. 2A are provided for simplicity. In practice, environment 200 may include additional devices, fewer devices, different devices, or differently-arranged devices than illustrated in FIG. 2A. In addition, any single device, illustrated in FIG. 2A, may be implemented as multiple, possibly distributed, devices. Further, any two (or more) devices may be implemented as a single device. For example, controller 235 and security device 240 may be combined into a single device that performs the functions of both controller 235 and security device 240. Also, a function described as being performed by one of the devices may be performed by a different device or a combination of devices.

As shown in FIG. 2B, environment 250 may include user devices 205, edge devices 210 and 215, switch device 220, firewall device 225, network 230, controller 235, and security device 240. In some implementations, edge devices 210 and 215, switch device 220, firewall device 225, and controller 235 may be associated with a wireless network, such as a WLAN, a WMAN, a WWAN, or the like.

User devices 205, edge devices 210 and 215, switch device 220, firewall device 225, controller 235, and security device 240 may correspond to like devices described above with regard to FIG. 2A. Unlike environment 200 in FIG. 2A, in environment 250, security device 240 may be located outside of the wireless network. For example, security device 240 may be connected to network 230. In some implementations, communications between security device 240 and edge devices 210 and/or 215 may occur via a secure communication vehicle, such as a virtual LAN (VLAN), a virtual private network (VPN), an encrypted channel, a secure communication protocol, or the like.

The example quantity and configuration of devices illustrated in FIG. 2B are provided for simplicity. In practice, environment 250 may include additional devices, fewer devices, different devices, or differently-arranged devices than illustrated in FIG. 2B. In addition, any single device, illustrated in FIG. 2B, may be implemented as multiple, possibly distributed, devices. Further, any two (or more) devices may be implemented as a single device. Also, a function described as being performed by one of the devices may be performed by a different device or a combination of devices.

As shown in FIG. 2C, environment 260 may include user devices 205, switch device 220, firewall device 225, network 230, controller 235, and edge devices 265 and 270. In some implementations, switch device 220, firewall device 225, controller 235, and edge devices 265 and 270 may be associated with a wireless network, such as a WLAN, a WMAN, a WWAN, or the like.

User devices 205, switch device 220, firewall device 225, and controller 235 may correspond to like devices described above with regard to FIG. 2A. Edge devices 265 and 270 may correspond to edge devices 210 and 215, respectively. Unlike edge devices 210 and 215, edge devices 265 and 270 may incorporate the functionality of security device 240. For example, edge devices 265 and 270 may collectively perform the functions relating to application awareness. In some implementations, one of edge devices 265 or 270 may function as a master device and the remaining edge devices 265 and 270 may function as slave devices. The master device may control the operations of the slave devices. In some other implementations, edge devices 265 and 270 may not have a master-slave relationship.

The example quantity and configuration of devices illustrated in FIG. 2C are provided for simplicity. In practice, environment 260 may include additional devices, fewer devices, different devices, or differently-arranged devices than illustrated in FIG. 2C. In addition, any single device, illustrated in FIG. 2C, may be implemented as multiple, possibly distributed, devices. Further, any two (or more) devices may be implemented as a single device. Also, a function described as being performed by one of the devices may be performed by a different device or a combination of devices.

FIG. 3 is a diagram illustrating example components of a device 300. Device 300 may correspond to one or more of the devices illustrated in FIGS. 2A-2C. For example, user device 205, edge device 210, edge device 215, switch device 220, firewall device 225, controller 235, security device 240, edge device 265, and/or edge device 270 may include one or more devices 300 and/or one or more components of device 300.

As shown in FIG. 3, device 300 may include a bus 310, a processor 320, a memory 330, a storage device 340, an input/output device 350, and a communication interface 360. Bus 310 may include a path, or a collection of paths, that permits communication among the components of device 300.

Processor 320 may include a processor, a microprocessor, an application specific integrated circuit (ASIC), a field programmable gate array (FPGA), or a type of processing logic that interprets and executes instructions. Memory 330 may include a random access memory (RAM) or another type of dynamic storage device that stores information and/or instructions for execution by processor 320; a read only memory (ROM) or another type of static storage device that stores static information and/or instructions for use by processor 320; and/or another type of memory, such as cache or flash memory. Storage device 340 may include a recording medium to store data that may be used by processor 320.

Input/output device 350 may include a mechanism that permits an operator to input information to device 300, such as a button, a keyboard, a keypad, or the like; and/or a mechanism that outputs information to the operator, such as a light emitting diode (LED), a display, or the like.

Communication interface 360 may include any transceiver-like mechanism(s) that enables device 300 to communicate with other devices and/or systems. For example, communication interface 360 may include a separate transmitter and receiver, or a transceiver that combines the functionality of both a transmitter and a receiver. Communication interface 360 may include a wired interface, a wireless interface, or both a wired interface and a wireless interface.

Device 300 may perform certain operations, as described in detail below. According to an example implementation, device 300 may perform these operations in response to processor 320 executing sequences of instructions contained in a computer-readable medium, such as memory 330. A computer-readable medium may be defined as a non-transitory memory device. A memory device may include space within a single physical storage device or spread across multiple physical storage devices.

The software instructions may be read into memory 330 from another computer-readable medium, such as storage device 340, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in some implementations, device 300 may include additional components, fewer components, different components, or differently-arranged components.

Figure 4:
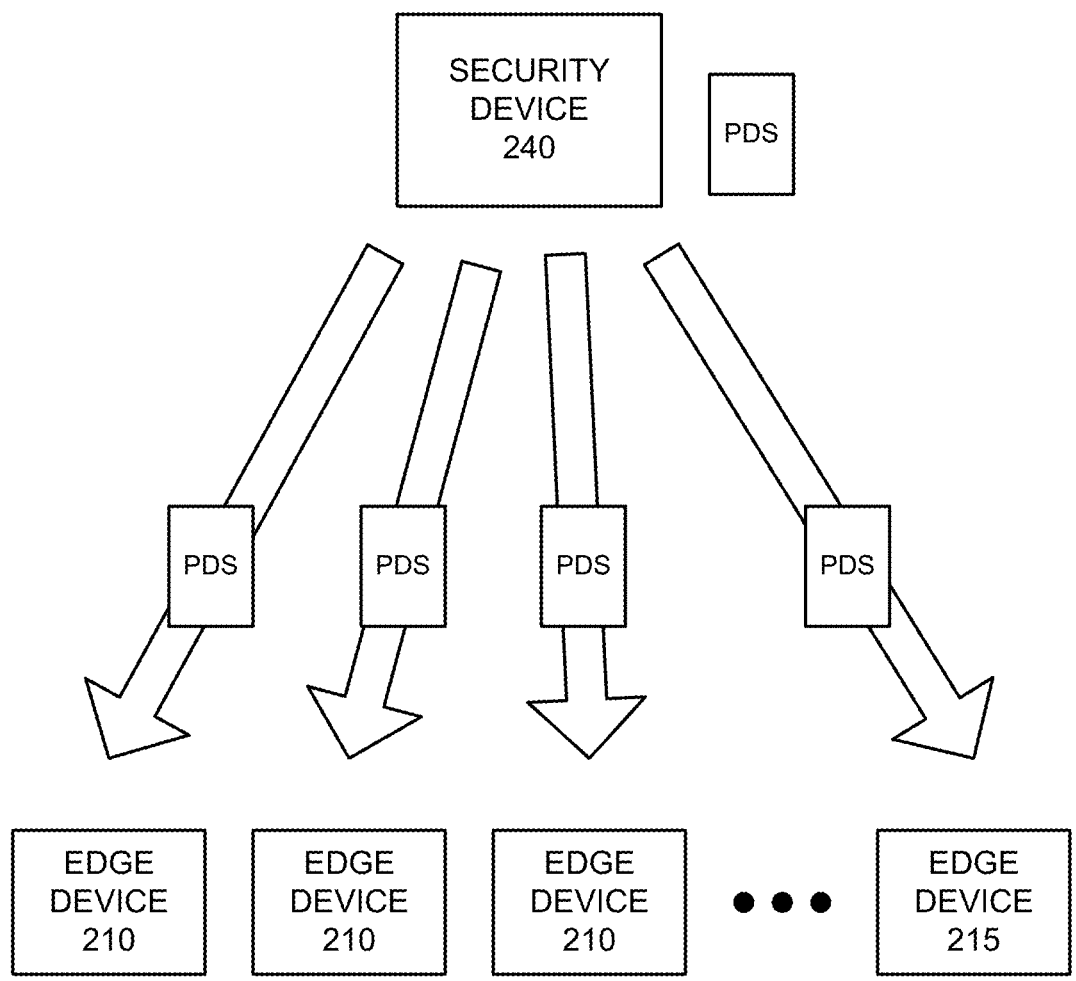
FIG. 4 is a diagram illustrating an example of distributing policy data structures in the example environments of FIGS. 2A, 2B, and/or 2C.

FIG. 4 is a diagram illustrating an example of distributing policy data structures in environment 200. While FIG. 4 relates to environment 200, similar functions may be performed in environment 250 or environment 260—though, in environment 260, a device, other than security device 240, may distribute the policy data structures (shown as "PDS" in FIG. 4).

Figure 5:
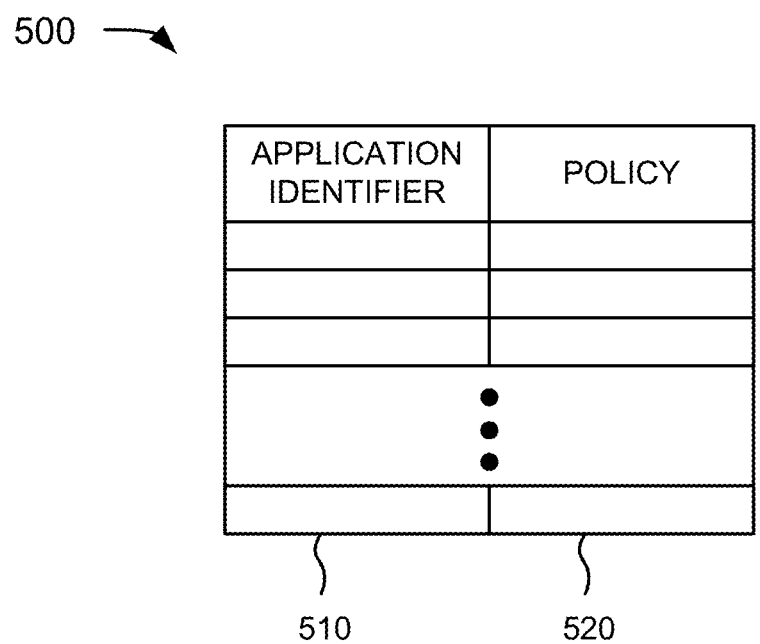
FIG. 5 is a diagram of an example policy data structure.

As shown in FIG. 4, security device 240 may receive and/or generate policy data structures. A policy data structure may associate application identifiers and corresponding policies. FIG. 5 is a diagram of an example policy data structure 500. As shown in FIG. 5, policy data structure 500 may include an application identifier field 510 and a policy field 520. Application identifier field 510 may store an application identifier associated with an application. The application identifier may include some form of identifier that uniquely identifies an application. Policy field 520 may store information regarding one or more policies to be applied to the application identified by the application identifier in application identifier field 510. A policy might relate to how an application should be treated in the network. For example, a policy may relate to whether the application should be allowed or denied access to the network; whether the application should be given priority in the network; an amount of bandwidth that should be granted to the application; a quality of service that should be given to the application; whether the application should be permitted to use a resource; or the like. In some implementations, a policy, for a particular application, may differ for different users, different user devices 205, different geographic locations, etc. For example, the same application, used by different users, operated on different user devices 205, or executing in different geographic locations, may be treated differently in the wireless network. While FIG. 5 shows data structure 500 as having a particular quantity and arrangement of fields, in some implementations, data structure 500 may include additional fields or different fields.

Returning to FIG. 4, security device 240 may receive information for a policy data structure from an operator of the wireless network. For example, the operator may interact with security device 240, via a command line interface, a web interface, or another type of interface, to specify a policy for a particular application identifier.

Security device 240 may generate different policy data structures for use by different devices in the wireless network. In some implementations, security device 240 may keep and use a first policy data structure, and send a second policy data structure to edge devices 210 and/or 215. In one example implementation, the first policy data structure may include information regarding a first set of application identifiers, and the second policy data structure may include information regarding a second set of application identifiers, which differ from the first set of application identifiers. In another example implementation, the first policy data structure may include information regarding a first set of application identifiers and the second policy data structure may include information regarding a second set of application identifiers, which are a subset of the first set of application identifiers.

In some implementations, security device 240 may keep and use a first policy data structure, and send multiple different second policy data structures to edge devices 210 and/or 215. In one example implementation, the first policy data structure may include information regarding a first set of application identifiers and the second policy data structures may include information regarding different second sets of application identifiers, which all differ from the first set of application identifiers. In another example implementation, the first policy data structure may include information regarding a first set of application identifiers and the second policy data structures may include information regarding different second sets of application identifiers, which are subsets of the first set of application identifiers.

In some implementations, the first policy data structure may include application identifiers for infrequently used applications—e.g., applications that attempt to communicate with the wireless network less than a threshold quantity of times (e.g., less than 100 times, 50 times, 10 times, etc.) or less than a threshold quantity of times within a particular time period (e.g., less than 10 times in the last hour, less than 100 times in the last week, less than 50 times in the last 24 hours, etc.). In some implementations, the second policy data structure may include application identifiers for frequently used applications—e.g., applications that attempt to communicate with the wireless network greater than a threshold quantity of times (e.g., greater than 100 times, 50 times, 10 times, etc.) or greater than a threshold quantity of times within a particular time period (e.g., greater than 10 times in the last hour, greater than 100 times in the last week, greater than 50 times in the last 24 hours, etc.). In some implementations, the threshold used to determine an infrequently used application may be the same as the threshold used to determine a frequently used application. In some other implementations, the threshold used to determine an infrequently used application may be different than the threshold used to determine a frequently used application.

In some implementations, the application identifiers included in the first policy data structure and the application identifiers included in the second data structure may be specified by an operator of the wireless network. In some other implementations, the application identifiers included in the first policy data structure and the application identifiers included in the second data structure may be automatically identified and/or periodically reanalyzed. For example, the application identifiers included in the first data structure and the second data structure may be periodically analyzed based on operations of the wireless network, such as which applications attempt to communicate via the wireless network. Based on this periodic analysis, the application identifiers for inclusion in the first data structure and the second data structure may be periodically determined.

Security device 240 may distribute the second policy data structures to edge devices 210 and 215. As described above, in some implementations, the same second policy data structure may be provided to all of edge devices 210 and 215. In some other implementations, the second policy data structure provided to one edge device 210 or 215 may differ from the second policy data structure provided to another edge device 210 or 215.

While FIG. 4 shows security device 240 as distributing the policy data structures directly to edge devices 210 and/or 215, in practice, security device 240 may send the policy data structures to edge devices 210 and/or 215 via one or more other devices, such as via controller 235 and/or switch device 220. Alternatively, the policy data structures may be provided to edge devices 210 and/or 215 from a source other than security device 240.

Figure 6:
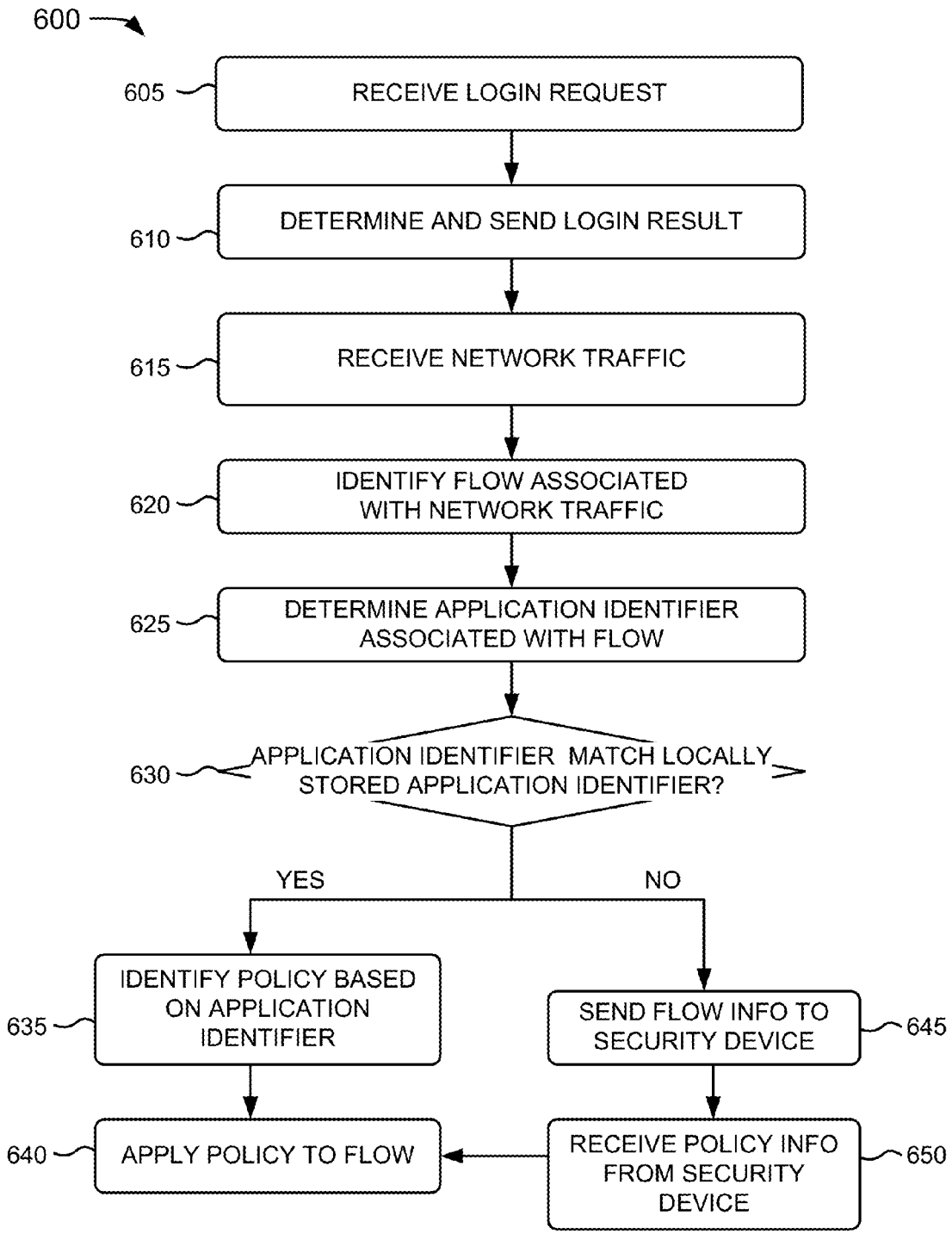
FIG. 6 is a flowchart of an example process for applying a policy to a particular flow.

FIG. 6 is a flowchart of an example process 600 for applying a policy to a particular flow. In some implementations, process 600 may be performed by an edge device 210 or 215 (hereinafter referred to as "edge device 210/215"). In some implementations, one or more blocks of process 600 may be performed by one or more devices instead of, or possibly in conjunction with, edge device 210/215, such as security device 240.

Process 600 may include receiving a login request (block 605). For example, a user, of a user device 205, may operate user device 205 to attempt to connect to the wireless network. In response, user device 205 may generate a login request. The login request may include information regarding an identity of user device 205 and/or information regarding an identity of the user of user device 205. User device 205 may send the login request to an edge device 210/215 of which user device 205 is located in connection range. Edge device 210/215 may receive the login request from user device 205.

Process 600 may include determining and sending a login result (block 610). For example, edge device 210/215 may authenticate user device 205 or the user of user device 205 based on the information in the login request. In some implementations, edge device 210/215 may compare the information in the login request to a database of authorized user devices and/or users to determine whether to permit user device 205 to connect to the wireless network. In some implementations, edge device 210/215 may communicate with another network device, such as a home subscriber server (HSS) and/or an authentication, authorization, and accounting server (AAA) (also referred to as an HSS/AAA server), to determine whether to permit user device 205 to connect to the wireless network.

Edge device 210/215 may generate a login result that indicates a result of the authentication process. The login result may indicate whether user device 205 is permitted to connect to the wireless network. Edge device 210/215 may send the login result to user device 205. Assume, for purposes of this example, that edge device 210/215 grants permission to user device 205 to connect to the wireless network.

Process 600 may include receiving network traffic (block 615) and identifying a flow associated with the network traffic (block 620). For example, the user, of user device 205, may initiate an application on user device 205 and the application may attempt to communicate on the wireless network. Assume that the application is a browser application and the user is attempting to access a particular website using the browser application. The browser application may generate network traffic relating to accessing the particular website and transmit the traffic to edge device 210/215.

Edge device 210/215 may receive the network traffic, from user device 205, and identify a flow associated with the network traffic. In some implementations, edge device 210/215 may generate a flow identifier based on information in the network traffic. For example, edge device 210/215 may generate the flow identifier using a combination of a source address, a destination address, a source port, a destination port, and/or a protocol. The source address and the destination address may refer to network addresses, such as IP addresses or MAC addresses, of devices associated with the network traffic. The source port and the destination port may refer to transport level ports, such as transport control protocol (TCP) or user datagram protocol (UDP) ports. The protocol may refer to a transport protocol, such as TCP or UDP.

In some implementations, edge device 210/215 may generate the flow identifier by, for example, subjecting the source address, the destination address, the source port, the destination port, and the protocol to a hash function or another type of function. In some implementations, edge device 210/215 may generate the flow identifier by subjecting fewer than all of the source address, the destination address, the source port, the destination port, and the protocol to the hash function or the other type of function.

Figure 7:
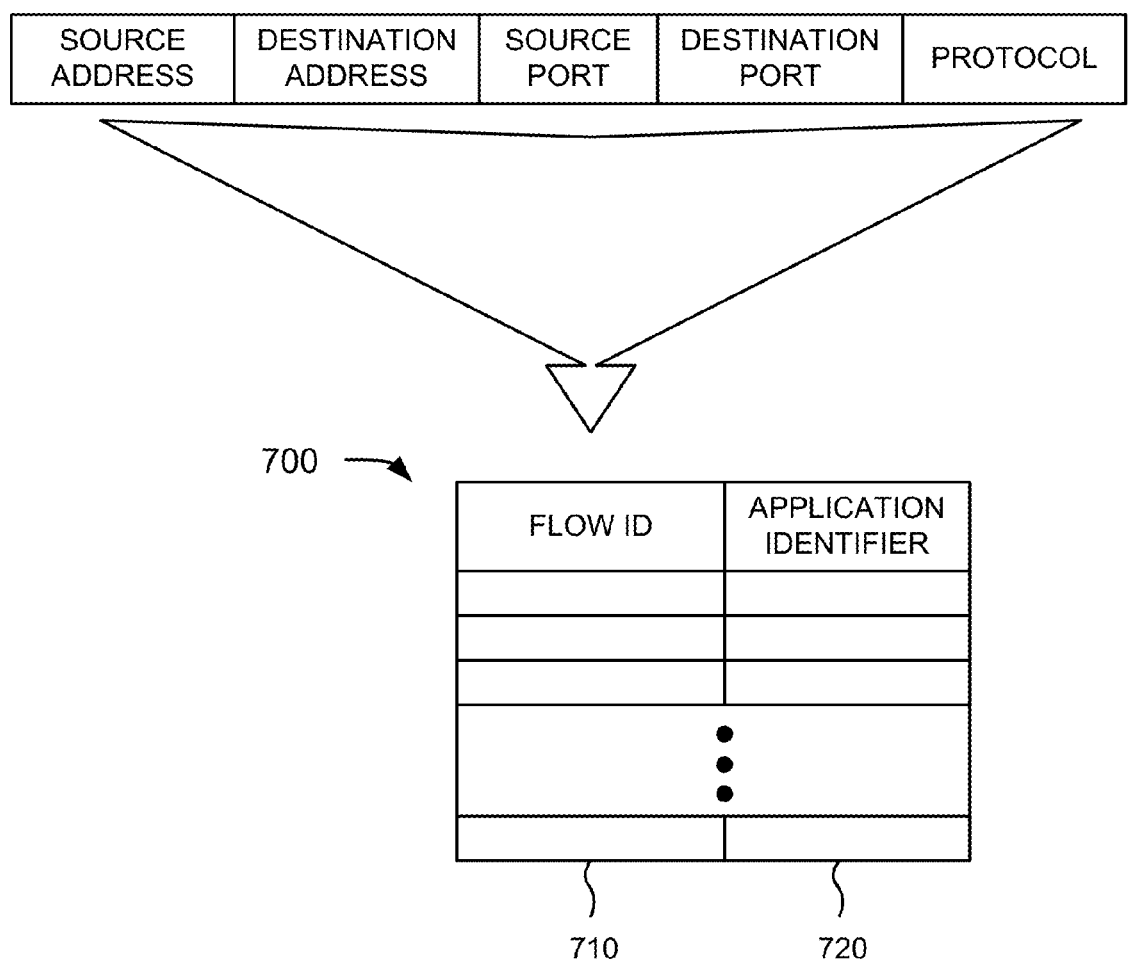
FIG. 7 is a diagram of an example flow table.

Edge device 210/215 may generate a record in a flow table for the identified flow. FIG. 7 is a diagram of an example flow table 700. As shown in FIG. 7, flow table 700 may include a flow identifier (ID) field 710 and an application identifier field 720. Flow identifier field 710 may store an identifier that uniquely identifies a particular flow. As described above and as shown in FIG. 7, the flow identifier may be generated by subjecting a source address, a destination address, a source port, a destination port, and/or a protocol to a hash function. Application identifier field 720 may store an application identifier associated with an application. The application identifier may include some form of identifier that uniquely identifies an application. While FIG. 7 shows flow table 700 as having a particular quantity and arrangement of fields, in some implementations, flow table 700 may include additional fields or different fields.

Returning to FIG. 6, process 600 may include determining an application identifier associated with the flow (block 625). For example, edge device 210/215 may receive and process the network traffic received from user device 205. In some implementations, edge device 210/215 may use deterministic finite automaton technology, a state machine, machine learning, pattern recognition, signature matching, predictive analysis, heuristic analysis, or another type of analysis to identify an application. Edge device 210/215 may analyze information about the traffic, such as information in the headers of the traffic, the content of the traffic, the size of packets in the traffic, or other information relating to the traffic, to determine the application identifier for the application. In one example implementation, this analysis may include a deep packet inspection. In another example implementation, this analysis may be less than a deep packet inspection. Edge device 210/215 may store the application identifier in the appropriate flow table record, such as in application identifier field 720 in FIG. 7.

Process 600 may include determining whether the application identifier matches a locally stored application identifier (block 630). For example, edge device 210/215 may determine whether the application identifier matches an application identifier in the policy data structure that edge device 210/215 stores. An example of a policy data structure has been described with regard to FIG. 5.

When the application identifier matches a locally stored application identifier (block 630—YES), process 600 may include identifying a policy based on the application identifier (block 635) and applying the policy to the flow (block 640). For example, edge device 210/215 may identify an entry, in its policy data structure, that has a matching application identifier. Edge device 210/215 may identify, from information in this entry, a policy to apply to the flow. Edge device 210/215 may apply the policy to the flow. The policy may dictate how the flow, associated with the application, should be treated in the network, as described above.

When the application identifier does not match a locally stored application identifier (block 630—NO), process 600 may include sending flow information to security device 240 (block 645) and receiving policy information from security device 240 (block 650). For example, edge device 210/215 may send information regarding the flow to security device 240. In some implementations, the information, regarding the flow, may include the application identifier determined for an application associated with the flow. In some implementations, the information, regarding the flow, may include traffic information or other information that security device 240 might need to determine an application identifier or to identify a policy for the flow.

Security device 240 may determine a policy to apply to the flow. For example, security device 240 may receive an application identifier from edge device 210/215 or may determine the application identifier based on the information received from edge device 210/215. Security device 240 may identify an entry, in its policy data structure, that has a matching application identifier. Security device 240 may identify, from information in this entry, a policy to apply to the flow. Security device 240 may send the policy, or information identifying the policy, to edge device 210/215.

Process 600 may include applying the policy to the flow (block 640). For example, edge device 210/215 may receive the policy, or information identifying the policy, from security device 240. Edge device 210/215 may apply the policy to the flow. The policy may dictate how the flow, associated with the application, should be treated in the network, as described above.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

For example, process 600 assumes that the flow table does not include an entry for the flow. In the situation where the flow table already includes an entry for the flow, edge device 210/215 may alter one or more of the blocks of process 600. For example, edge device 210/215 may identify the flow associated with the network traffic (block 620) and determine that the flow table already includes an entry for this flow. In this case, edge device 210/215 may read the application identifier from the entry (block 625) and use the application identifier to determine whether the application identifier matches a locally stored application identifier (block 630). Edge device 210/215 may then identify and apply a corresponding policy to the flow, as described above.

Additionally, or alternatively, in the situation where the application identifier does not match a locally stored application identifier (block 630—NO), security device 240 may determine and apply the policy to the flow. In some implementations, security device 240 may selectively provide the policy to edge device 210/215. In these situations, security device 240 may use a process, such as the process described below with regard to FIG. 8 or FIG. 9, to determine whether to provide the policy to edge device 210/215.

Figure 8:
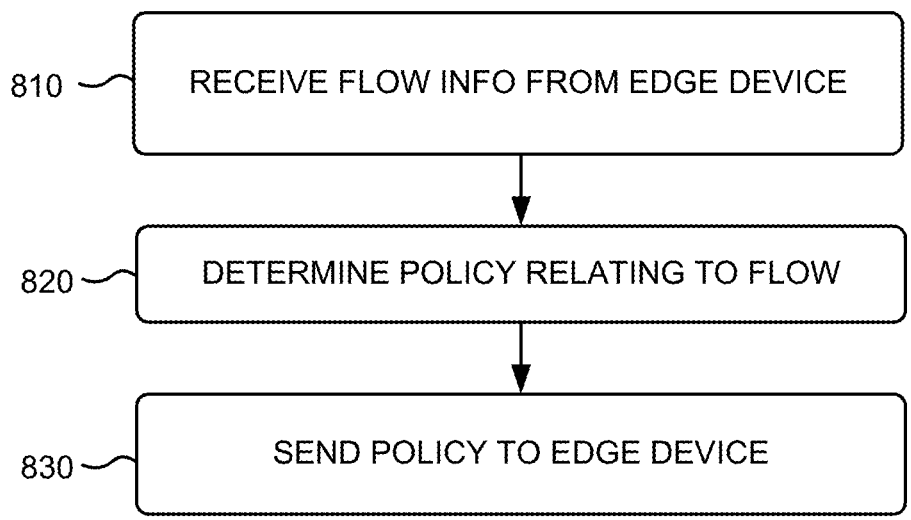
FIG. 8 is a flowchart of an example process for sending a policy to an edge device.

FIG. 8 is a flowchart of an example process 800 for sending a policy to an edge device. In some implementations, process 800 may be performed by security device 210. In some implementations, one or more blocks of process 800 may be performed by one or more devices instead of, or possibly in conjunction with, security device 240, such as edge device 210/215.

Process 800 may include receiving flow information from an edge device (block 810). For example, as described above with regard to blocks 645 and 650 of FIG. 6, edge device 210/215 may send information regarding a flow to security device 240. In some implementations, the information, regarding the flow, may include the application identifier determined for the application associated with the flow. In some implementations, the information, regarding the flow, may include traffic information or other information that security device 240 might need to determine an application identifier or to identify a policy for the flow. Security device 240 might determine the application identifier using a technique similar to the techniques identified above with regard to block 625 of FIG. 6.

Process 800 may include determining a policy relating to the flow (block 820) and sending the policy to the edge device (block 830). For example, security device 240 may determine a policy to apply to the flow. As described above, security device 240 may receive an application identifier from edge device 210/215 or may determine the application identifier based on the information received from edge device 210/215. Security device 240 may identify an entry, in its policy data structure, that has a matching application identifier. Security device 240 may identify, from information in this entry, a policy to apply to the flow. Security device 240 may send the policy, or information identifying the policy, to edge device 210/215. Edge device 210/215 may receive the policy, or the information identifying the policy, and apply the policy to the flow. In some implementations, edge device 210/215 may also update its policy data structure with information regarding the application identifier and the corresponding policy. In some other implementations, as described above, security device 240 may apply the policy to the flow rather than edge device 210/215.

While FIG. 8 shows process 800 as including a particular quantity and arrangement of blocks, in some implementations, process 800 may include fewer blocks, additional blocks, or a different arrangement of blocks. Additionally, or alternatively, some of the blocks may be performed in parallel.

Figure 9:
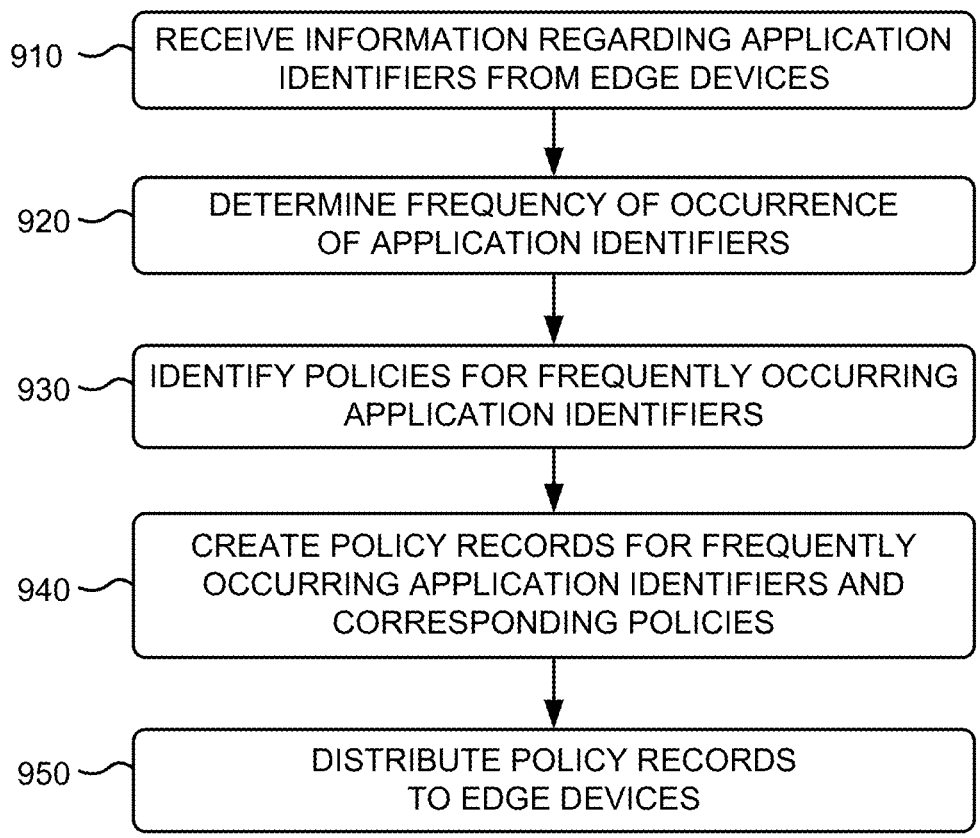
FIG. 9 is a flowchart of an example process for distributing policy records to edge devices.

FIG. 9 is a flowchart of an example process 900 for distributing policy records to edge devices. In some implementations, process 900 may be performed by security device 240. In some implementations, one or more blocks of process 900 may be performed by one or more devices instead of, or possibly in conjunction with, security device 240, such as edge device 210/215.

Process 900 may include receiving information regarding application identifiers from edge devices (block 910). For example, edge device 210/215 may periodically send information, to security device 240, regarding application identifiers for flows occurring at edge device 210/215. In some implementations, edge device 210/215 may send information regarding an application identifier whenever the application identifier is added to the flow table. In some implementations, edge device 210/215 may send information regarding application identifiers added to the flow table at certain intervals (e.g., every minute, hour, day, etc.). Security device 240 may receive the information, regarding the application identifiers, from edge device 210/215.

Process 900 may include determining a frequency of occurrence of application identifiers (block 920). For example, security device 240 may determine an infrequently occurring application identifier as an application identifier for an infrequently used application—e.g., an application that attempts to communicate with the wireless network less than a threshold quantity of times (e.g., less than 100 times, 50 times, 10 times, etc.) or less than a threshold quantity of times within a particular time period (e.g., less than 10 times in the last hour, less than 100 times in the last week, less than 50 times in the last 24 hours, etc.). Security device 240 may determine a frequently occurring application identifier as an application identifier for a frequently used application—e.g., an application that attempts to communicate with the wireless network greater than a threshold quantity of times (e.g., greater than 100 times, 50 times, 10 times, etc.) or greater than a threshold quantity of times within a particular time period (e.g., greater than 10 times in the last hour, greater than 100 times in the last week, greater than 50 times in the last 24 hours, etc.).

Process 900 may include identifying policies for the frequently occurring application identifiers (block 930). For example, security device 240 may perform a look-up operation in its policy data structure, using the frequently occurring application identifiers, to identify the policies for these frequently occurring application identifiers. An example of a policy data structure has been described with regard to FIG. 5.

Process 900 may include creating policy records for frequently occurring application identifiers and corresponding policies (block 940) and distributing the policy records to the edge devices (block 950). For example, security device 240 may form a separate policy record for each combination of an application identifier and its corresponding policy. Security device 240 may send the policy records to edge device 210/215 for inclusion in their locally-stored policy data structures.

While FIG. 9 shows process 900 as including a particular quantity and arrangement of blocks, in some implementations, process 900 may include fewer blocks, additional blocks, or a different arrangement of blocks. Additionally, or alternatively, some of the blocks may be performed in parallel.

Figure 10:
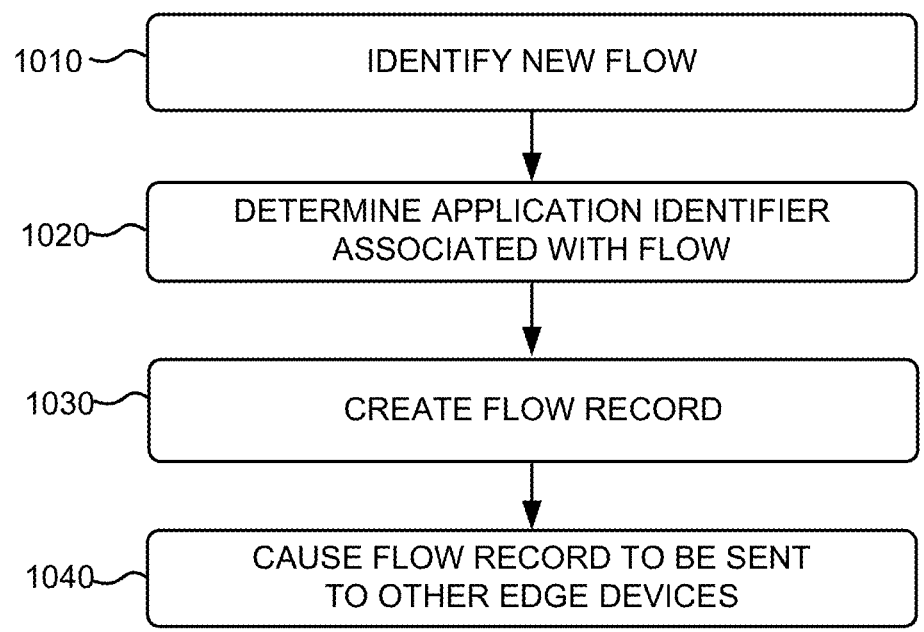
FIG. 10 is a flowchart of an example process for sharing flow records between edge devices.

FIG. 10 is a flowchart of an example process 1000 for sharing flow records between edge devices. In some implementations, process 1000 may be performed by an edge device 210/215. In some implementations, one or more blocks of process 1000 may be performed by one or more devices instead of, or possibly in conjunction with, edge device 210/215, such as security device 240 or controller 235.

Process 1000 may include identifying a new flow (block 1010). For example, as described above with regard to block 620 of FIG. 6, edge device 210/215 may identify a flow associated with network traffic from a user device 205. Edge device 210/215 may generate a flow identifier and determine whether the flow table already stores an entry corresponding to that flow identifier. If the flow table does not already store an entry corresponding to the flow identifier, edge device 210/215 may create a new entry in the flow table and populate the entry with the flow identifier.

Process 1000 may include determining an application identifier associated with the flow (block 1020). For example, as described above with regard to block 625, edge device 210/215 may generate an application identifier for the application associated with the flow. Edge device 210/215 may store the application identifier in the corresponding entry in the flow table.

Process 1000 may include creating a flow record (block 1030). For example, edge device 210/215 may create a flow record that includes information from the entry in the flow table, such as the flow identifier and the corresponding application identifier. In some implementations, edge device 210/215 may generate a flow record only for those new flow table entries that include application identifiers that match application identifiers in its policy data structure.

Process 1000 may include causing the flow record to be sent to other edge devices 210/215 (block 1040). For example, in some implementations, edge device 210/215 may send the flow record to controller 235 for transmission to the other edge devices 210/215. In some other implementations, edge device 210/215 may send the flow record to the other edge devices 210/215 without sending the flow record to controller 235. In some implementations, the flow record may be sent to a subset of edge devices 210/215, such as those edge devices 210/215 that are neighbors of edge device 210/215 in the wireless network. In some other implementations, the flow record may be sent to all other edge devices 210/215 in the wireless network.

As a result of sharing flow records among edge devices 210/215, policies may be consistently and uninterruptedly applied to application flows even when user devices 205 roam out of connection range of one edge device 210/215 and within the connection range of another edge device 210/215.

While FIG. 10 shows process 1000 as including a particular quantity and arrangement of blocks, in some implementations, process 1000 may include fewer blocks, additional blocks, or a different arrangement of blocks. Additionally, or alternatively, some of the blocks may be performed in parallel.

Figure 11:
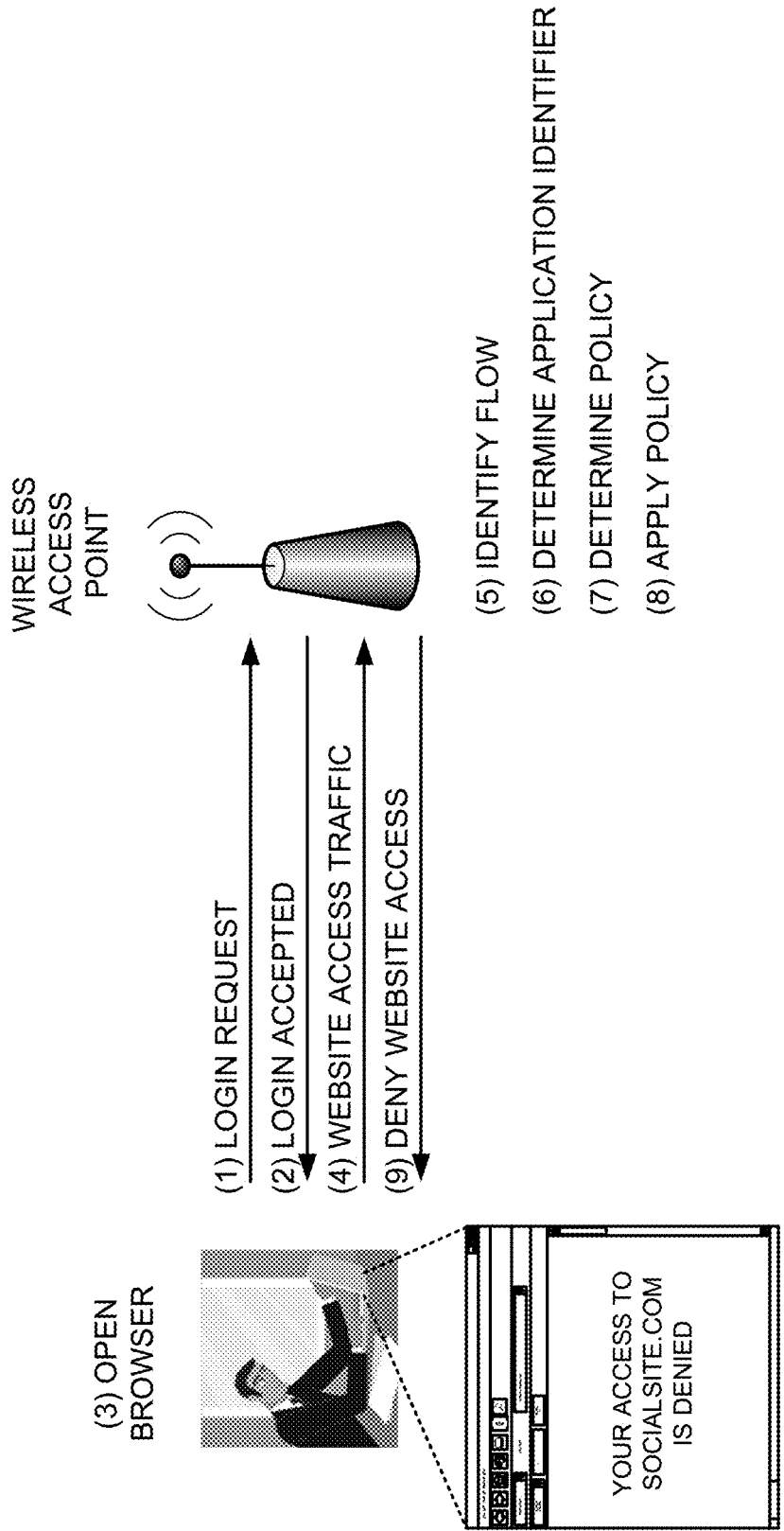
FIG. 11 is a diagram illustrating an example of a system and/or method described herein.

FIG. 11 is a diagram illustrating an example of a system and/or method described herein. For the example of FIG. 11, assume that a user (Joe) works for ABC company in Fairfax, Va. Today, Joe visits the Sunnyvale, Calif. office of ABC company. Joe takes with him his work-issued laptop. Joe enters an office of ABC company and powers up his laptop. Joe is prompted to log into the corporate network. Joe enters his login credentials and his laptop sends a login request to a company wireless access point (as indicated by (1) in FIG. 11). The wireless access point may process the login request to authenticate Joe to access the corporate network. Assume that the wireless access point authenticates Joe to access the corporate network. In this case, the wireless access point may send a message to Joe's laptop indicating that the login has been accepted (as indicated by (2) in FIG. 11).

Assume that, after gaining access to the corporate network, Joe opens a web browser on his laptop (as indicated by (3) in FIG. 11) and instructs the web browser to access the socialsite.com website by entering the address of the website into the web browser. As a result, Joe's laptop may generate traffic associated with accessing the socialsite.com website (as indicated by (4) in FIG. 11). The wireless access point may process the traffic to identify the flow associated with the traffic (as indicated by (5) in FIG. 11). The wireless access point may determine an application identifier corresponding to the application associated with the flow (as indicated by (6) in FIG. 11). Assume that the application identifier is associated with the domain of the website (i.e., socialsite.com).

The wireless access point may determine whether the application identifier matches an application identifier in its policy data structure. Assume that the application identifier matches an application identifier in the policy data structure. The wireless access point may use the application identifier to determine a policy to apply to the application by using the application identifier to look-up the policy in the policy data structure (as indicated by (7) in FIG. 11). Assume that the policy indicates that access to the socialsite.com website is prohibited.

The wireless access point may apply the policy to the application (as indicated by (8) in FIG. 11). Because the policy indicates that access to the socialsite.com website is to be denied, the wireless access point may deny Joe's attempted access to the socialsite.com website. In this case, the wireless access point may block all traffic between Joe's laptop and the socialsite.com website. The wireless access point may generate a web page that informs Joe that the attempted access is denied and may send this web page for display on Joe's laptop (as indicated by (9) in FIG. 11). Joe's laptop may display the web page, which informs Joe that access to the socialsite.com website is denied.

While the example of FIG. 11 involves a user operating a single web browser window, the example also applies to the user operating multiple web browser windows. Each web browser window may be associated with a different flow (e.g., the information used to generate the flow identifiers, associated with the different flows, differs between the different web browser windows). The wireless access point may process the different flows separately and apply a respective policy to each of the flows.

Figure 12:
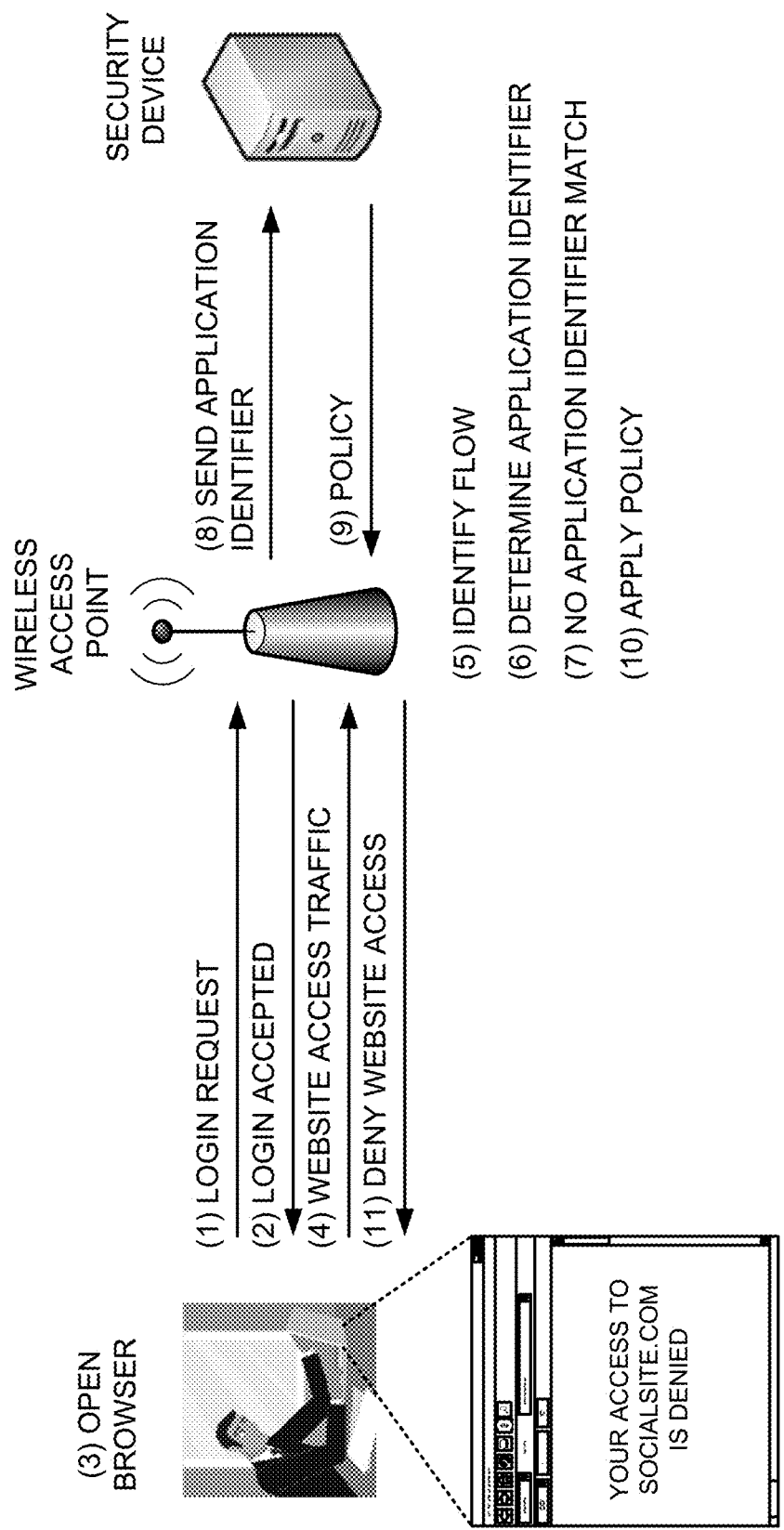
FIG. 12 is a diagram illustrating another example of a system and/or method described herein.

FIG. 12 is a diagram illustrating another example of a system and/or method described herein. For the example of FIG. 12, assume the same fact pattern as the example of FIG. 11. Similar to the example of FIG. 11, Joe enters his login credentials and his laptop sends a login request to a company wireless access point (as indicated by (1) in FIG. 12). The wireless access point authenticates Joe to access the corporate network and sends a message to Joe's laptop indicating that the login has been accepted (as indicated by (2) in FIG. 12). Joe opens a web browser on his laptop (as indicated by (3) in FIG. 12) and again instructs the web browser to access the socialsite.com website by entering the address of the website into the web browser. As a result, Joe's laptop may generate traffic associated with accessing the socialsite.com website (as indicated by (4) in FIG. 12). The wireless access point may process the traffic to identify the flow associated with the traffic (as indicated by (5) in FIG. 12). The wireless access point may determine an application identifier corresponding to the application associated with the flow (as indicated by (6) in FIG. 12). Assume that the application identifier is associated with the domain of the website (i.e., socialsite.com).

The wireless access point may determine whether the application identifier matches an application identifier in its policy data structure. Assume that the application identifier does not match an application identifier in the policy data structure (as indicated by (7) in FIG. 12). In this case, the wireless access point may send the application identifier to the security device (as indicated by (8) in FIG. 12). The security device may use the application identifier to determine a policy to apply to the application by using the application identifier to look-up the policy in its policy data structure. Assume that the policy indicates that access to the socialsite.com website is prohibited. The security device may send the policy to the wireless access point (as indicated by (9) in FIG. 12).

The wireless access point may receive the policy from the security device. The wireless access point may apply the policy to the application (as indicated by (10) in FIG. 12). Because the policy indicates that access to the socialsite.com website is to be denied, the wireless access point may deny Joe's attempted access to the socialsite.com website. In this case, the wireless access point may block all traffic between Joe's laptop and the socialsite.com website. The wireless access point may generate a web page that informs Joe that the attempted access is denied and may send this web page for display on Joe's laptop (as indicated by (11) in FIG. 12). Joe's laptop may display the web page, which informs Joe that access to the socialsite.com website is denied.

Implementations, described herein, may provide a system and/or method for performing distributed application awareness. As described above, some functions, associated with application awareness, may be performed by edge devices, while some other functions, associated with application awareness, may be performed by a central security device. This may serve to reduce traffic in the network compared to a situation where a security device performs all of the functions associated with application awareness.

The foregoing description provides illustration and description, but is not intended to be exhaustive or to limit the implementations to the precise form disclosed. Modifications and variations are possible in light of the above disclosure or may be acquired from practice of the implementations.

Further, the term "table," as used herein, may refer to any searchable form or arrangement of data within a memory device.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed:

1. A security device, comprising:
a memory to store a first plurality of application identifiers; and
one or more processors to:
provide a second plurality of application identifiers to an edge device, of a plurality of edge devices, in a network,
the first plurality of application identifiers including one or more application identifiers that are not included in the second plurality of application identifiers and are not included in a third plurality of application identifiers stored by another edge device of the plurality of edge devices,
the edge device communicating with the security device,
the edge device being provided at an edge of the network between the security device and a user device attempting to access the network via the edge device;
receive information associated with network traffic generated by an application executing on the user device,
the network traffic being received from the user device and via the edge device,
the information associated with the network traffic being provided to the security device when an application identifier, associated with the network traffic, does not match one of the second plurality of application identifiers;
determine, based on the information associated with the network traffic, the application identifier associated with the network traffic,
the application identifier identifying the application;
determine whether the application identifier matches one of the first plurality of application identifiers stored in the memory;
identify a policy associated with the one of the first plurality of application identifiers when the application identifier matches the one of the first plurality of application identifiers; and
provide the policy to the edge device to permit the edge device to apply the policy to the network traffic.

2. The security device of claim 1, where the policy indicates one or more of:
whether the application is allowed or denied access to the network,
whether the application is to receive a priority relative to other applications,
an amount of bandwidth that the application is to receive,
a quality of service that the application is to receive, or
whether the application is permitted to use a resource of the network.

3. The security device of claim 1, where the one or more processors are further to:
determine a frequency of occurrence of a first application; and
selectively identify the frequency of occurrence of the first application based on a threshold,
the frequency of occurrence of the first application being identified as frequently occurring when the threshold is satisfied; and
the frequency of occurrence of the first application being identified as infrequently occurring when the threshold is not satisfied.

4. The security device of claim 1, where the one or more processors are further to:
identify another policy, associated with another one of the first plurality of application identifiers; and
provide the other policy to one or more other edge devices of the plurality of edge devices.

5. The security device of claim 1, where the one or more processors are further to:
receive first information associated with a first application,
the first application being associated with the first plurality of application identifiers;
determine, based on the first information, a frequency of occurrence of the first application; and
identify the first application as frequently occurring or infrequently occurring based on the frequency of occurrence of the first application.

6. The security device of claim 5, where the one or more processors are further to:
create a policy record for the first application based on identifying the first application as frequently occurring; and
provide the policy record to the edge device of the plurality of edge devices.

7. The security device of claim 1, where the one or more processors are further to:
receive a flow identifier from the edge device; and
identify the policy based on the flow identifier and the application identifier.

8. A non-transitory computer-readable medium storing instructions, the instructions comprising:
one or more instructions that, when executed by one or more processors of a device, cause the one or more processors to:
store first information associated with a first plurality of applications;
provide second information, associated with a second plurality of applications, to an edge device, of a plurality of edge devices, in a network,
the first information including one or more application identifiers that are not included in the second information and are not included in third information, associated with a third plurality of applications, stored by another edge device of the plurality of edge devices,
the edge device communicating with the device,
the edge device being provided at an edge of the network between the device and a user device attempting to access the network via the edge device;
receive information associated with network traffic generated by an application executing on the user device,
the network traffic being received from the user device and via the edge device,
the information associated with the network traffic being provided to the device when an application identifier, associated with the network traffic, is not included in the second information;
determine, based on the information associated with the network traffic, the application identifier associated with the network traffic,
the application identifier identifying the application;
determine that the application identifier is included in the first information;
identify a policy to be applied to the application identified by the application identifier; and
provide the policy to the edge device to permit the edge device to apply the policy to the network traffic.

9. The non-transitory computer-readable medium of claim 8, where the one or more instructions, when executed by the one or more processors, further cause the one or more processors to:
generate a first policy data structure;
store the first policy data structure;
generate a second policy data structure; and
provide the second policy data structure to the edge device.

10. The non-transitory computer-readable medium of claim 8, where the one or more instructions, when executed by the one or more processors, further cause the one or more processors to:
determine a frequency of use of the application;
generate a policy data structure associated with the application; and
provide the policy data structure to the edge device based on the frequency of use of the application.

11. The non-transitory computer-readable medium of claim 8, where the one or more instructions, when executed by the one or more processors, further cause the one or more processors to:
determine a frequency of use of the application;
generate a policy data structure associated with the application; and
store the policy data structure based on the frequency of use of the application.

12. The non-transitory computer-readable medium of claim 8, where the one or more instructions, when executed by the one or more processors, further cause the one or more processors to:
receive flow information from the edge device,
the flow information indicating a source of the network traffic and a destination of the network traffic; and
identify the policy based on the flow information.

13. The non-transitory computer-readable medium of claim 8, where:
the first information includes a first plurality of application identifiers, and the second information includes a second plurality of application identifiers,
the first plurality of application identifiers including the one or more application identifiers that are not included in the second plurality of application identifiers.

14. The non-transitory computer-readable medium of claim 8, where:
the policy indicates a manner of treatment of the network traffic,
the manner of the treatment of the network traffic reducing an amount of the network traffic processed by the device and increasing the amount of the network traffic processed by the edge device.

15. A method, comprising:
storing, by a network device, a first set of application identifiers;
providing, by the network device, a second set of application identifiers to an access point device, of a plurality of access point devices, in a network,
the first set of application identifiers including one or more application identifiers that are not included in the second set of application identifiers and are not included in a third set of application identifiers stored by another access point device of the plurality of access point devices,
the access point device communicating with the network device,
the access point device being provided at an edge of the network and receiving network communications from a user device attempting to communicate via the access point device;
receiving, by the network device, information associated with the network communications generated by an application executing on the user device,
the network communications being received from the user device and via the access point device,
the information associated with the network communications being provided to the network device when an application identifier, associated with the network communications, does not match one of the second set of application identifiers;
determining, by the network device, based on the information associated with the network communications, the application identifier associated with the network communications,
the application identifier identifying the application;
determining, by the network device, that the application identifier matches one of the first set of application identifiers;
identifying, by the network device and in a policy data structure, a policy associated with the one of the first set of application identifiers; and
providing, by the network device, the policy to the access point device to permit the access point device to apply the policy to the network communications.

16. The method of claim 15, further comprising:
identifying, in a second policy data structure, a second policy associated with another one of the first set of application identifiers; and
applying the second policy to second network communications generated by the user device.

17. The method of claim 15, further comprising:
receiving flow information from the access point device, the flow information indicating a flow of the network communications; and
identifying the policy based on the flow information.

18. The method of claim 15, where the access point device is an edge device, of a plurality of edge devices, that processes frequently occurring applications.

19. The method of claim 15, where the network device is a security device that processes infrequently occurring applications.

20. The method of claim 15, where the policy data structure includes a plurality application identifiers and a plurality of policies that correspond with the plurality of application identifiers.

* * * * *